United States Patent [19]

Ott

[11] Patent Number: 4,478,807
[45] Date of Patent: Oct. 23, 1984

[54] METHOD FOR MANUFACTURE OF AMMONIUM THIOSULFATE FROM AMMONIA AND SOLID SULFUR OR $H_2S$ RICH GAS STREAM AND/OR BOTH SOLID SULFUR AND $H_2S$ GAS STREAMS

[76] Inventor: Clifford J. Ott, 10315 Tolman, Houston, Tex. 77034

[21] Appl. No.: 429,150

[22] Filed: Sep. 30, 1982

[51] Int. Cl.$^3$ ............................................. C01B 17/64
[52] U.S. Cl. ................................................. 423/514
[58] Field of Search ......................................... 423/514

[56] References Cited

U.S. PATENT DOCUMENTS

| | | | |
|---|---|---|---|
| 2,219,258 | 10/1940 | Hill | 423/514 |
| 2,315,534 | 4/1941 | Marasco | 260/563 |
| 2,586,459 | 2/1952 | Farr et al. | 423/514 |
| 3,431,070 | 3/1969 | Keller | 423/514 |
| 3,473,891 | 10/1969 | Mack | 423/514 |
| 3,493,337 | 3/1970 | Every et al. | 423/514 |
| 3,524,724 | 8/1970 | Every et al. | 423/514 |
| 3,591,335 | 7/1971 | Grimsley et al. | 423/514 |
| 3,937,793 | 2/1976 | Metzgen et al. | 423/514 |

FOREIGN PATENT DOCUMENTS

| | | | |
|---|---|---|---|
| 2635649 | 2/1978 | Fed. Rep. of Germany | 423/514 |
| 1506030 | 12/1966 | France | 423/514 |
| 713746 | 8/1954 | United Kingdom | 423/514 |

Primary Examiner—Gary P. Straub
Attorney, Agent, or Firm—Pravel, Gambrell, Hewitt & Kimball

[57] ABSTRACT

A process for the manufacture of aqueous ammonium thiosulfate from sulfur dioxide wherein ammonium sulfite is formed as an intermediate product by the scrubbing reaction of ammonia with sulfur dioxide in the presence of water. Preferably, the ammonia is added to the sulfur dioxide in the bottom of the second scrubbing reaction vessel so as to maintain the sulfur dioxide and ammonia in liquid phase.

10 Claims, 2 Drawing Figures

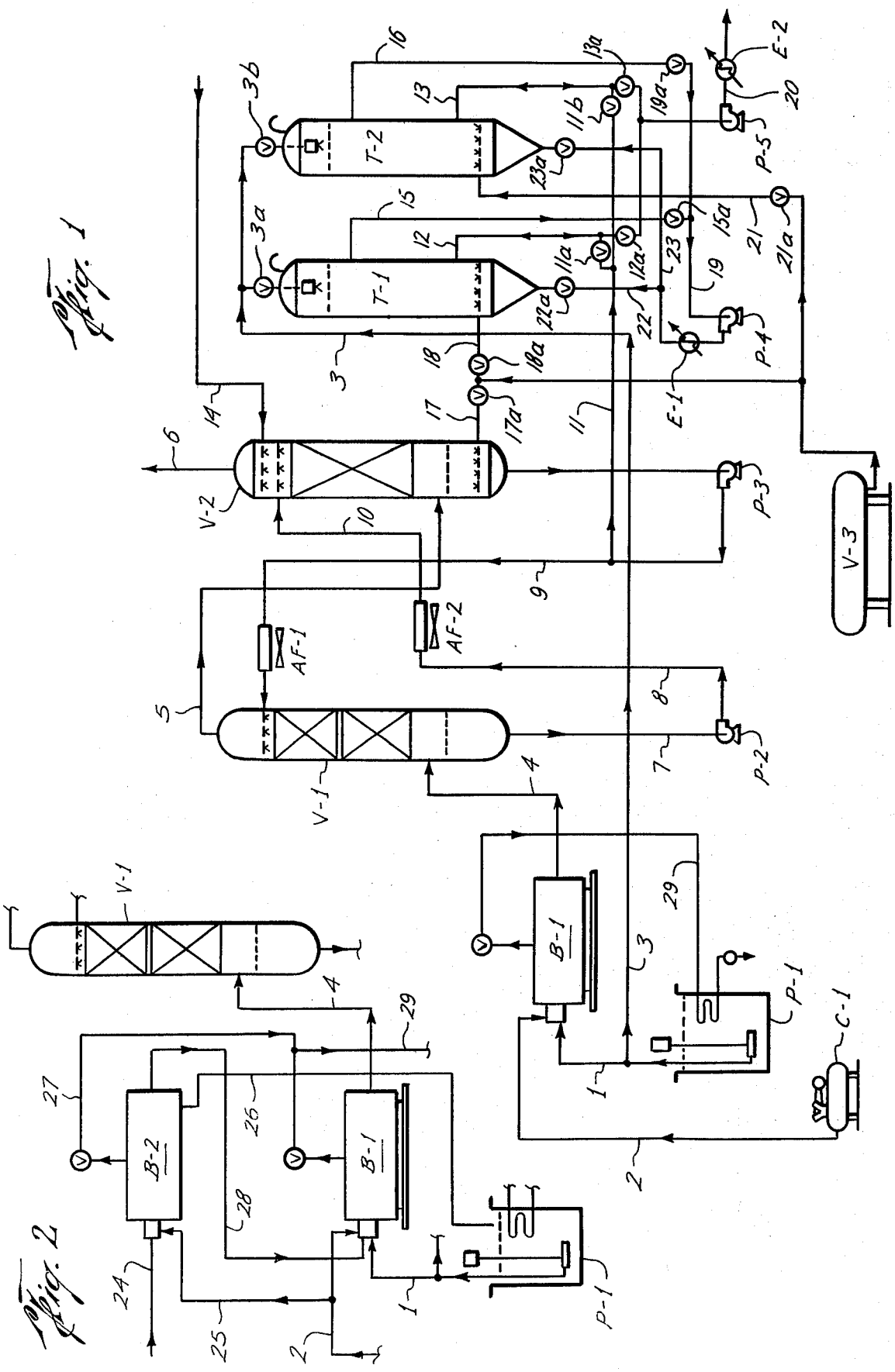

METHOD FOR MANUFACTURE OF AMMONIUM THIOSULFATE FROM AMMONIA AND SOLID SULFUR OR $H_2S$ RICH GAS STREAM AND/OR BOTH SOLID SULFUR AND $H_2S$ GAS STREAMS

FIELD OF THE INVENTION

This invention relates to an improved method of producing ammonium thiosulfate. More particularly, this invention relates to a method of producing ammonium thiosulfate without the formation of undesirable sulfides and sulfur by-products.

It is known to produce ammonium thiosulfate by reacting ammonia and sulfur dioxide in an aqueous solution of ammonium thiosulfate and then in a second stage with hydrogen sulfide, U.S. Pat. No. 3,431,070; by reacting ammonium bi-sulfite solution, ammonia, sulfur and catalytically acting amounts of hydrogen sulfide in a first stage and then reacting the solution with sulfur in a second stage, U.S. Pat. No. 3,473,891; by dissolving elemental sulfur in liquid ammonia and bubbling oxygen gas through the solution at extremely high pressures, U.S. Pat. No. 3,493,337; by reacting sulfur dioxide with an aqueous solution to form ammonium bi-sulfite and reacting this solution with ammonia, sulfur and sulfur dioxide in a second stage at high pressures, U.S. Pat. No. 3,524,724; by reacting a primary amine with hydrogen sulfide and sulfur dioxide, U.S. Pat. No. 3,591,335; and by reacting $(NH_4)_2S_x$ with $SO_2$ in ammonium hydroxide, U.S. Pat. No. 2,315,534.

All of the above methods of producing ammonium thiosulfate have the disadvantage of producing excesses of ammonium sulfides and sulfites which, in turn, produce sulfur particles and deposits on equipment resulting in plugged up systems. Such particles are often in the form of a sulfide fog, the formation of such fog having been a major obstacle to ammonium thiosulfate production in prior processes. This reaction, commonly known as the Claus reaction, occurs from the reaction of $H_2S$ and $SO_2$, which produces water and solid particulate sulfur.

None of the art known to the applicant obviates this problem. For example, U.S. Pat. No. 3,524,724 requires additional sulfur dioxide to be added in a second stage to the solution of ammonium bi-sulfite. Such additional sulfur dioxide added in the second stage could produce the Claus reaction and sulfur that consequently plugs up the system. In addition, U.S. Pat. No. 3,524,724 operates at very high pressures.

U.S. Pat. No. 3,431,070 uses ammonium thiosulfate in the first stage and hydrogen sulfide in the second stage. It produces solid sulfur in the second stage. The hydrogen sulfide present would result in the Claus reaction, which would produce sulfur in solid particulate form which may plug up the system.

Likewise, U.S. Pat. No. 3,473,891 favors the formation of ammonium bi-sulfite which reacts with hydrogen sulfide. An excess of ammonium sulfide would result in the Claus reaction which produces the type of solid sulfur that may plug up the system.

SUMMARY OF THE INVENTION

The invention comprises a process for the manufacture of aqueous ammonium thiosulfate from sulfur dioxide wherein ammonium sulfite is formed as an intermediate product by the scrubbing reaction of ammonia with sulfur dioxide in the presence of water. Preferably, the ammonia is added to the sulfur dioxide in the bottom of a second scrubbing reaction vessel so as to maintain the sulfur dioxide and ammonia in liquid phase.

The sulfur dioxide can be obtained either through air combustion of molten sulfur or air combustion of sulfur produced from combustion of $H_2S$ rich gas. The $SO_2$ is reacted in a first reaction zone in the presence of a circulating solution of $(NH_4)OH$, $(NH_4)_2SO_3$ and $NH_4HSO_3$ and is then maintained at a temperature necessary to keep the density of ammonium sulfite up for later reaction and avoid having to remove $H_2O$ later. Remaining $SO_2$ is removed in a second reaction zone, and $H_2O$ is added to the solution in the second reaction zone. $NH_3$ is added to the solution in the bottom of the second reaction zone in the liquid phase. The solution is passed to a third reaction zone where a molar excess of sulfur is added to the solution, preferably in amounts equal to about three times the required amount for the reaction to provide sulfur in a particulate form suitable for reaction with ammonium sulfite. Lastly, $NH_3$ is added to the third reaction zone in sufficient amounts to convert any excess $SO_2$ to ammonium bi-sulfite.

DESCRIPTION OF THE DRAWINGS

The invention can best be described by reference to the drawings of which:

FIG. 1 is a schematic flow sheet showing production of ammonium thiosulfate by the method of the invention; and FIG. 2 is an alternate flow sheet showing production of the sulfur dioxide used in production of the ammonium thiosulfate from $H_2S$ rich gas by the method of the present invention.

DETAILED DESCRIPTION OF THE INVENTION

Referring now to the drawings and particularly to FIG. 1, sulfur is maintained in a molten state in the sulfur tank P-1 by a steam coil. The sulfur is discharged by line 1 to the sulfur burner B-1. Combustion air from air compressor C-1 is admitted to the burner B-1 in a slight excess of the theoretical amount for the complete combustion of the sulfur to sulfur dioxide. The heat of combustion is recovered in the waste heat boiler and is converted into steam which is used for heating purposes in the plant.

The combustion products containing nitrogen and some water vapor flow via line 4 to the $SO_2$ scrubber V-1 where the $SO_2$ is scrubbed from the combustion products in a circulating solution of ammonium hydroxide $(NH_4)OH$, ammonium sulfite $(NH_4)_2SO_3$, and ammonium bi-sulfite $NH_4HSO_3$.

Alternatively, a feed stock of $H_2S$ rich gas may be used to produce the sulfur for combustion. The preferred concentration of $H_2S$ in the gas should be 50 mol percent or higher if the $H_2S$ rich gas is to be the only feed to the plant. Below this concentration a combination of solid sulfur with the $H_2S$ bearing gas streams should be used. As shown in FIG. 2, the $H_2S$ rich gas is burned in B-2 with sufficient air to produce a burner effluent of about two parts of $H_2S$ to one part of $SO_2$. The thermal conversion of $H_2S$ to sulfur is sufficient to provide for the third zone reaction sulfur to be used in the reaction tanks. The cooled combustion gases from B-2 flow to the burner of B-1 and the combustion of the $H_2S$ and any other combustibles is completed. No liquid sulfur is burned in the B-2 burner and the process is the same as when producing $SO_2$ from liquid sulfur. If it is desired to feed a gas to the B-2 burner with a low H₂S content, sufficient liquid sulfur will not be produced for the later needed subsequent reactions. Thus, additional liquid sulfur will have to be provided through the B-1 burner.

Referring again to FIG. 1, the ammonia rich circulating solution from V-2 is added to the top of V-1 through line 9. The ammonia is preferred to be an-hydrous ammonia, however, concentrated aqueous solutions could be used. The reaction which occurs in the sulfur dioxide scrubber V-1 is as follows:

$$NH_3 + H_2O \rightarrow NH_4OH \qquad 1.$$

$$NH_4OH + SO_2 \rightarrow NH_4HSO_3 \qquad 2.$$

$$2NH_4HSO_3 \rightleftharpoons (NH_4)_2SO_3 + SO_2 + H_2O \qquad 3.$$

Reactions 1 and 2 go to completion; however, reaction 3 reaches an equilibrium depending on temperature. In this process the temperature is maintained preferably in a range of 170° to 190° F. The upper limit is about 220° F. which is where the solution boils. If H₂S rich gases containing hydrocarbons are used, a minimum of 140° F. is required to prevent the reaction of CO₂ with NH₄OH. The equilibrium in reaction 3 is shifted to the right which makes the ammonium sulfite, (NH₄)₂SO₃ available for reaction with sulfur to produce the ammonium thiosulfate. In addition, any carbon dioxide in the combustion gases will not react with the ammonia at this temperature and will pass through the system as an inert gas.

After SO₂ scrubbing takes place, the remaining gaseous combustion products containing nitrogen, water vapor, and small amounts of ammonia and sulfur dioxide flow by line 5 to the ammonia scrubber V-2 where the remaining sulfur dioxide and ammonia is removed. Then nitrogen, water and traces of SO₂ and NH₃ are vented from V-2.

The hot solution from V-1 is pumped by P-2 to air cooler AF-2. The temperature of the solution is cooled to no higher than about 180° F. and flows through line 10 to the top of V-2.

The solution is circulated between V-1 and V-2 and is again cooled by air cooler AF-1 to no higher than about 180° F. Sufficient circulation of solution is maintained to keep the solution temperature in V-1 at from about 140° F. to about 225° F., the boiling point of the solution, and preferably to about 190° F. by the heat absorbed from the combustion gases. The solution absorbs any remaining SO₂ and NH₃ in the combustion gases from V-1 before venting the gases to the atmosphere.

A sufficient amount of ammonia from storage tank V-3 is added to the bottom of V-2 through valve 17a in sufficient amounts to maintain the pH of the solution from the bottom of V-1 to from about 5 to about 7 and preferably to 6.2. The ammonia must be added in V-2. If gaseous ammonia comes in contact with a concentrated SO₂ or H₂S bearing gas, such as in the bottom of V-1, a heavy fog of small particles of sulfides is formed. These particles are very hard to wet and will be carried out the vent as a very undesirable plume. Therefore, the ammonia is added to the solution in the bottom of V-2 so all reactions occur in the aqueous phase.

In this process care is taken to burn all the H₂S to SO₂ before the hot gases contact the liquid aqueous solution containing the ammonia. Therefore, no sulfides fog is formed. This fog formation has been a major problem with most of the other processes.

The density of the solution from the bottom of V-2 is monitored. Process water is added to the top of V-2 via line 14 to maintain the density of the solution from about 1.2 to about 1.3 and preferably at about 1.24. The dense solution flows from the bottom of V-2 via line 11 through valve 22a to T-1. Ammonia is added through valve 18a into T-1. When T-1 is half full, a molar excess of liquid sulfur is sprayed through valve 3a into the solution, preferably in amounts equal to approximately three times the required amount for reaction. The hot liquid sulfur on contact with the dense solution provides sulfur in particulate form suitable for reaction with ammonium sulfite to produce ammoniums thiosulfate. The temperature in the third reaction zone or T-1 should be maintained preferably in a range of from about 170° F. to about 190° F. but may be as low as about 140° F. and as high as about 220° F. In reaction tank T-1 the following reactions occur:

$$(NH_4)_2SO_3 + SO \rightarrow (NH_4)_2S_2O_3 \qquad 1.$$

$$NH_3 + H_2O \rightarrow NH_4OH \qquad 2.$$

$$NH_4OH + SO_2 \rightarrow NH_4HSO_3 \qquad 3.$$

$$2NH_4HSO_3 \rightleftharpoons (NH_4)_2SO_3 + SO_2 + H_2O \qquad 4.$$

$$(NH_4)_2SO_3 + SO \rightarrow (NH_4)_2S_2O_3 \qquad 5.$$

Reactions 1, 2, 3 and 5 go to completion; however, reaction 4 produces SO₂ which must be reacted with additional ammonia in reaction 3 to convert the SO₂ to the bi-sulfite. Reactions 4 and 5 then continue until approximately ½ to 1% of the solution by weight is ammonium bi-sulfite. All of the above reactions occur at very low pressures, 0 to 10 psig,—substantially atmospheric pressures, and do not require a catalyst. The reaction is quite slow, therefore, the tank is typically sized for one day's production to allow for sufficient time for reaction and pump out of product.

The solution density from the bottom of V-2 is brought to the specific gravity of from about 1.2 to about 1.3 and preferably to about 1.24 before flowing to the reaction tank T-2. The additional weight of sulfur reacted increases the specific gravity of the finished ammonium thiosulfate solution to about 1.32. It is not necessary to evaporate water from the solution to produce a standard 60% by weight ammonium thiosulfate solution.

The position of the valves in FIG. 1 is illustrated in Table 1:

TABLE 1

| Valve in drawing: | Filling T-1 | Filling T-2 |
|---|---|---|
| 3a | open (spraying) | closed |
| 3b | closed | open (spraying) |
| 11a | open | closed |
| 11b | closed | open |
| 12a | closed | closed |
| 13a | closed | closed |
| 15a | closed | closed |
| 17a | closed | closed |
| 18a | open | closed |
| 19a | closed | closed |
| 21a | closed | open |
| 22a | closed (open when circulating) | closed |
| 23a | closed | closed |

TABLE 1-continued

| Valve in drawing: | Filling T-1 | Filling T-2 |
|---|---|---|
| | | (open when circulating) |

In filling T-1, valve 3a is open for the spraying of the liquid sulfur, and valve 3b is closed. Valve 11a is open to receive the solution from V-2. Valve 18a is open so that ammonia may be added to T-1 and the rest of the valves are closed except that valve 22a is opened when the solution is circulating between T-1 and T-2.

In filling T-2, valve 3b is opened to allow spraying of liquid sulfur into T-2 and valve 11b is opened to allow passage of the solution from V-2 into T-2. Valve 21a is open so that ammonia may be added to T-2 and all the rest of the valves are closed during filling of T-2 except for valve 23a which is open when the solution is being circulated between T-1 and T-2.

When T-1 becomes full, the rundown from V-2 is switched to T-2 as described above, in an alternating sequence, and pump P-4 starts circulation in T-1 to ensure good contact between the solution and solid sulfur. Steam is added to a heat exchanger E-1 to maintain a temperature of about 175° F. to 200° F. The ammonia added through valve 21a is added to maintain a reaction pH of from about 5 to about 7. When the reaction is complete, additional ammonia is added to adjust the pH to about 8 and the circulation and steam is shut off. After the unreacted sulfur is settled, the ammonium thiosulfate solution with a specific gravity of about 1.32 is pumped by pump P-5 through heat exchanger E-2 to storage. When T-2 becomes full, the reaction process is started over again using T-2.

The foregoing disclosure and description of the process is illustrative and explanatory thereof and various changes in the size, shape and materials, is in the details of the illustrated construction, may be made within the scope of the appended claims without departing from the spirit of the invention.

I claim:

1. A process for the preparation of aqueous ammonium thiosulfate which inhibits the formation of sulfides and sulfur by-products which comprises:

reacting $SO_2$ in a first reaction zone in the presence of a circulating solution of $(NH_4)OH$, $(NH_4)_2SO_3$ and $NH_4HSO_3$ to remove most of the $SO_2$, said circulating solution being free of $(NH_4)_2S_2O_3$;

cooling and passing said circulating solution to a second reaction zone along with any remaining $SO_2$ from the first reaction zone to remove substantially all of said remaining $SO_2$;

adding an aqueous solution of ammonium hydroxide to said circulating solution in said second reaction zone;

passing said solution to a third reaction zone which is separate from said first and second reaction zones and where liquid sulfur as the sole source of sulfur values is added to said solution in an amount sufficient to provide sulfur in a particulate form suitable for reaction with ammonium sulfite to produce ammonium thiosulfate;

adding ammonia to provide ammonium hydroxide in said third reaction zone in sufficient amounts to bind the $SO_2$ produced by the equilibrium reaction of ammonium bisulfite to ammonium sulfite, sulfur dioxide and water while maintaining the pH at 5-7; and removing the ammonium thiosulfate as an at least about 60 wt% solution from said third reaction zone without circulating it to either said first or second reaction zones.

2. A process for the preparation of aqueous ammonium thiosulfate which inhibits the formation of sulfides and sulfur by-products which comprises:

burning elemental sulfur by air combustion to produce $SO_2$;

reacting $SO_2$, substantially free of sulfides and oxygen, in a first reaction zone in the presence of a circulating solution of $(NH_4)OH$, $(NH_4)_2SO_3$ and $NH_4HSO_3$ to remove most of the $SO_2$, said circulating solution being free of $(NH_4)_2S_2O_3$;

cooling said circulating solution to not more than about 180° F. and passing said solution to a second reaction zone along with any remaining $SO_2$ from the first reaction zone to remove substantially all of said remaining $SO_2$;

adding sufficient amounts of $NH_3$ to said solution in the second reaction zone to maintain the pH of said solution in said second reaction zone from about 5 to about 7 and the density of said solution in said second reaction zone from about 1.2 to about 1.3;

passing said circulating solution to a third reaction zone which is separate from said first and second reaction zones and wherein a molar excess of liquid sulfur, as the sole source of sulfur values is sprayed into said solution to provide sulfur in a particulate form suitable for reaction with ammonium sulfite to produce ammonium thiosulfate;

maintaining the temperature in said third reaction zone, in a range of from about 140° F. to about 220° F.;

adding ammonia to provide ammonium hydroxide in said third reaction zone in sufficient amounts to bind the $SO_2$ produced by the equilibrium reaction of ammonium bisulfite to ammonium sulfite, sulfur dioxide and water while maintaining the pH at 5-7; and removing the ammonium thiosulfate as an at least about 60 wt% solution from said third reaction zone without circulating it to either said first or second reaction zones.

3. The process in claim 2 wherein at least some of said $SO_2$ is produced by the combustion of $H_2S$.

4. The process in claim 3 wherein said $H_2S$ gases are preferably about 50 mol percent.

5. The process in claim 2 wherein the process operates at substantially atmospheric pressure.

6. The process in claim 2 wherein said solution in said second reaction scrubs substantially all of the $SO_2$ so that gases vented from said zone to the atmosphere are environmentally nonpolluting.

7. A process conducted at about atmospheric pressure for the preparation of ammonium thiosulfate which inhibits the formation of sulfides and sulfur by-products which comprises:

burning elemental sulfur and $H_2S$ rich gas by air combustion to provide a combustion product containing $SO_2$;

reacting $SO_2$, substantially free of sulfides and oxygen, with a circulating solution of $(NH_4)OH$, $(NH_4)_2SO_3$ and $NH_4HSO_3$ but free of $(NH_4)_2S_2O_3$ to provide ammonium sulfite, and passing said solution through a cooling zone to a second reaction zone along with any remaining $SO_2$ from the first reaction zone to remove substantially all of said remaining $SO_2$;

adding a sufficient amount of $NH_3$ to said solution in the bottom of said second reaction scrubber zone below the liquid level in order to maintain the pH of said solution in said second reaction zone at from about 5 to about 7 and the density of said solution in said second reaction zone at from about 1.2 to about 1.3;

passing said solution to a third reaction zone and spraying said solution therein with a molar excess of sulfur as the sole source of sulfur values to provide sulfur in a particulate form suitable for reaction with ammonium sulfite to produce ammonium thiosulfate;

maintaining the temperature in said third reaction zone in a range of from about 170° F. to about 190° F.;

adding $NH_3$ to provide ammonium hydroxide in said third reaction zone in sufficient amounts to bind the $SO_2$ produced by the equilibrium reaction of ammonium bisulfite to ammonium sulfite, sulfur dioxide and water while maintaining the pH at 5–7;

circulating said solution in said third reaction zone for a sufficient amount of time for the reaction to complete; and pumping the resultant at least about 60 wt% ammonium thiosulfate solution to storage without entering said first and second reaction zones.

8. In a process for the manufacture of aqueous ammonium thiosulfate from sulfur dioxide wherein ammonium sulfite and ammonium bisulfite are formed as reaction products by the reaction of aqueous ammonia with gaseous sulfur dioxide, the improvement which comprises:

introducing sulfur dioxide which is substantially free of sulfides and oxygen into a first reaction zone for reacting with a solution which is also introduced therein and which includes the aqueous ammonia but excludes ammonium thiosulfate;

maintaining said sulfur dioxide in liquid solution during the reaction to form said reaction products;

maintaining the pH during said reaction in the first reaction zone of from about 5 to about 7 by providing a sufficient amount of aqueous ammonia to react with substantially all of the sulfur dioxide, wherein the formation of sulfides is inhibited during such reaction and the ammonium bisulfite is converted to ammonium sulfite;

transferring the ammonium sulfite to another reaction zone which is separate from said first reaction zone and there adding liquid sulfur as the sole source of sulfur values to the ammonium sulfite produced from said reaction to produce ammonium thiosulfate while maintaining the pH at 5–7; and removing the ammonium thiosulfate as an at least about 60 wt% solution after formation thereof without thereafter contacting it with the reactants or the products in the first reaction zone.

9. The process of claim 8, wherein:

the aqueous ammonia is supplied to a second reaction zone which is separate from said another reaction zone and then is transmitted to the first reaction zone; and the pH is maintained by adding a sufficient amount of the ammonia in the second reaction zone so as to maintain the pH in the first reaction zone where the main reaction between the sulfur dioxide and the aqueous ammonia occurs.

10. The process set forth in claim 9, wherein the pH of the liquid at the outlet from said first reaction zone is about 6.2.

* * * * *